United States Patent [19]
Kampf

[11] 3,852,769
[45] Dec. 3, 1974

[54] DUAL CHANNEL STRIP CHART RECORDER WITH VISIBLE STYLI

[75] Inventor: Richard S. Kampf, Costa Mesa, Calif.

[73] Assignee: Beckman Instruments, Inc., Fullerton, Calif.

[22] Filed: Mar. 26, 1973

[21] Appl. No.: 344,498

[52] U.S. Cl. ............................. 346/49, 346/139 B
[51] Int. Cl. .............................................. G01d 9/30
[58] Field of Search.. 346/49, 139 R, 139 A, 139 B, 346/139 C

[56] References Cited
UNITED STATES PATENTS

| | | | |
|---|---|---|---|
| 2,726,075 | 12/1955 | Hosford | 346/139 A X |
| 3,167,379 | 1/1965 | Grafstein | 346/139 A X |
| 3,200,403 | 8/1965 | Bush | 346/61 |
| 3,291,920 | 12/1966 | Hauser | 346/17 X |
| 3,787,878 | 1/1974 | Kampf et al. | 346/49 |

Primary Examiner—Joseph W. Hartary
Attorney, Agent, or Firm—R. J. Steinmeyer; P. R. Harder

[57] ABSTRACT

A dual channel strip recorder for providing two overlapping traces on a movable chart, with relatively small time displacement therebetween, wherein the traces are visible to an operator at the time of recording. The recorder, in one preferred embodiment, utilizes pressure sensitive chart paper which can be written upon from one side and viewed from the other side through a transparent viewing plate. The recorder utilizes two styli that are driven back and forth across the back side of the moving chart by two corresponding flexible, movable bands which are aligned in side-by-side relationship. The styli are positioned next to each other near the adjacent edges of the bands. The transparent plate, positioned on the front side of the paper, acts as a writing support surface for the paper and styli. Writing pressure for the styli is provided by springs exerting pressure upon backing plates positioned behind the movable bands. A special styli design is utilized to form one narrow trace and one wide trace to facilitate identification of the traces.

4 Claims, 4 Drawing Figures

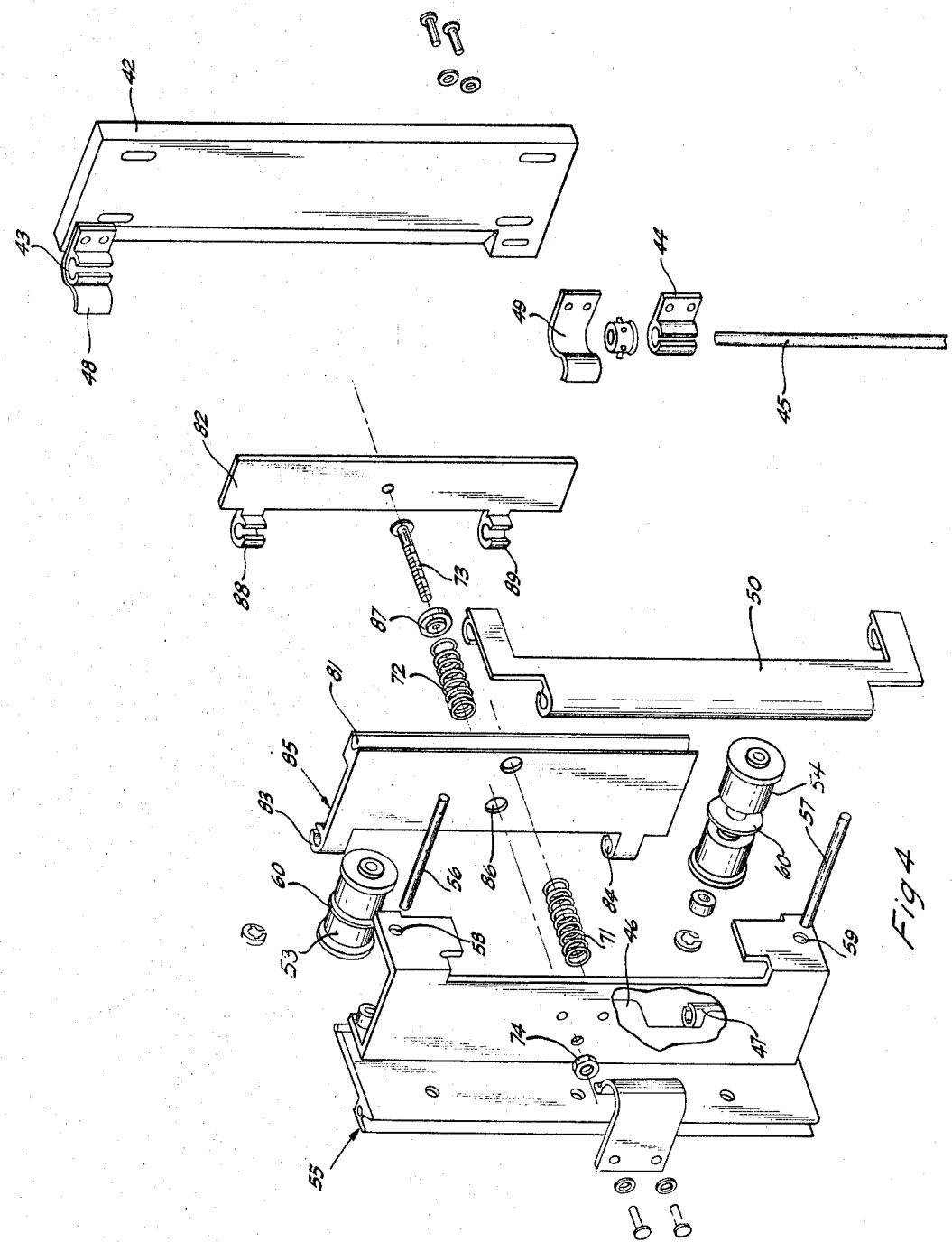

DUAL CHANNEL STRIP CHART RECORDER WITH VISIBLE STYLI

BACKGROUND OF THE INVENTION

The present invention concerns a two-pen strip chart recorder that provides two overlapping traces upon a movable chart with relatively small time displacement between the traces. More particularly, the invention concerns a two-pen recorder which utilizes pressure sensitive chart paper and includes two styli that are utilized to write by exerting pressure upon the back of the chart paper to form traces which are immediately visible from the front side of the chart paper through a transparent paper support plate.

A need exists in the prior art for two-pen recorders capable of forming multiple traces on the same chart with each trace being related to an independent input. One desired capability of such recorders is the ability to form overlapping traces which have little or no time displacement. This is desirable since any interpretation of the chart must allow for existing time displacement of the two traces. Particularly where direct comparison of two traces is necessary, difficulty ensues in accurately interpreting the recorded results of widely time displaced traces.

Another requirement of two-pen systems is that the recorded traces be available for viewing by an operator at an early time, preferably as they are formed. For example, it is desirable that an operator be able to immediately view the formation of a transient response upon a chart.

Various two-pen systems have been utilized in the prior art to achieve one or the other of such purposes. One such two-pen recorder is described in U.S. Pat. application Ser. No. 268,496 to Richard S. Kampf and Lisle W. Sultzbaugh filed July 3, 1972, now U.S. Pat. No. 3,787,878, and assigned to the assignee of the present application. The two-pen recorder described therein is particularly advantageous in that it permits recordation of two overlapping traces upon a chart without time displacement therebetween. However, the system therein suffers from the disadvantage that the traces formed are not immediately viewable by an operator.

SUMMARY OF THE INVENTION

Accordingly, it is an object of the invention to provide a two-pen strip chart recorder for recording two overlapping traces upon a strip chart which overcomes the disadvantages of prior art systems.

It is another object of the invention to provide a two-pen recorder wherein two traces are recorded upon the moving chart paper with little time displacement therebetween, which traces are viewable at the time of recording.

It is a further object of the invention to provide a two-pen recorder adapted to use pressure sensitive chart paper that can be written upon from the rear side in such a way that the traces formed are viewable from the front side of the paper.

It is yet another object of the invention to provide a two-pen recorder which utilizes two styli moved back and forth across the chart by a pair of parallel, movable, flexible bands wherein the styli are positioned next to each other near the adjacent edges of the bands.

The above and other objects of the invention are attained in a strip chart recorder wherein a section of movable chart paper is aligned with a recording station during advancement from a supply station past the recording station to a take-up roll. The recording station includes two pens or styli arranged to write upon the rear side of the section of chart paper with the trace being visible from the front side of the chart paper through a transparent viewing plate which acts as a supporting surface for the paper which is forced against it by the styli. The styli are carried upon two flexible bands which are individually movable to carry the respective styli back and forth across the movable chart. Writing pressure is exerted upon the styli by resilient means acting upon backing plates positioned behind each of the bands. The flexible steel bands are trained about pulleys located proximate either edge of the chart paper and associated with suitable driving means. A unique stylus design is utilized to permit easily discernible wide and narrow traces to be formed upon the chart. The strip chart recorder is especially adapted for use with pressure sensitive paper, but can easily be adapted for use with translucent chart paper and other marking means.

BRIEF DESCRIPTION OF THE DRAWINGS

These and other features and advantages of the invention will become apparent from the following detailed description taken in conjunction with the accompanying drawings wherein:

FIG. 4 is a diagrammatic, exploded view, with parts broken away, showing details of the recording station illustrated in FIG. 2.

DETAILED DESCRIPTION OF THE INVENTION

Figure 1:
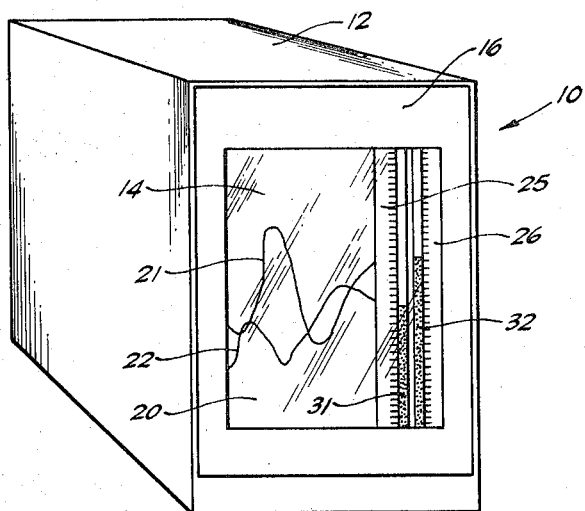
FIG. 1 is a perspective view illustrating a recorder comprising one preferred embodiment of the invention.

Referring now to the drawings and particularly to FIG. 1, a preferred embodiment of the invention is illustrated comprising a two-pen strip chart recorder 10 including a housing 12 provided with a viewing window 14 formed in a door 16 that is hinged at one side of the housing. The chart recorder includes a movable chart 20, visible through window 14, having two overlapping continuous traces 21, 22 formed thereon. Also visible through window 14 are movable indicator strips 31, 32 having marks thereon (such as marks of different colors) corresponding respectively to the positions of the styli forming traces 21, 22 for displaying the instantaneous amplitude of each of the traces. Indicator strips 31, 32 are mounted over fixed scale strips 25, 26 bearing appropriate scale indicia. The arrangement illustrated permits viewing of the chart through window 14 and comparison of the instantaneous values of traces 21, 22. If desired, door 16 can be opened and the recorder withdrawn part way from the housing for closer inspection of the chart.

Figure 3:
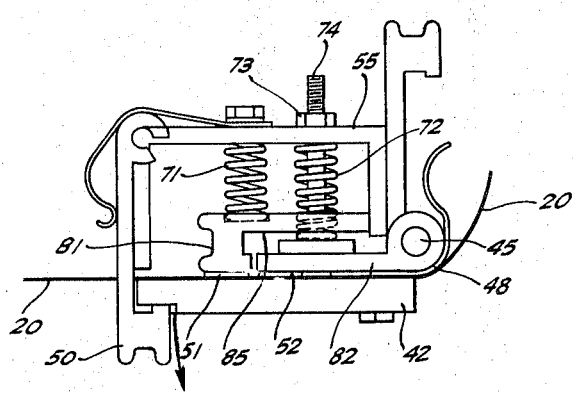
FIG. 3 is a top sectional view of the recording station illustrated in FIG. 2.
Figure 2:
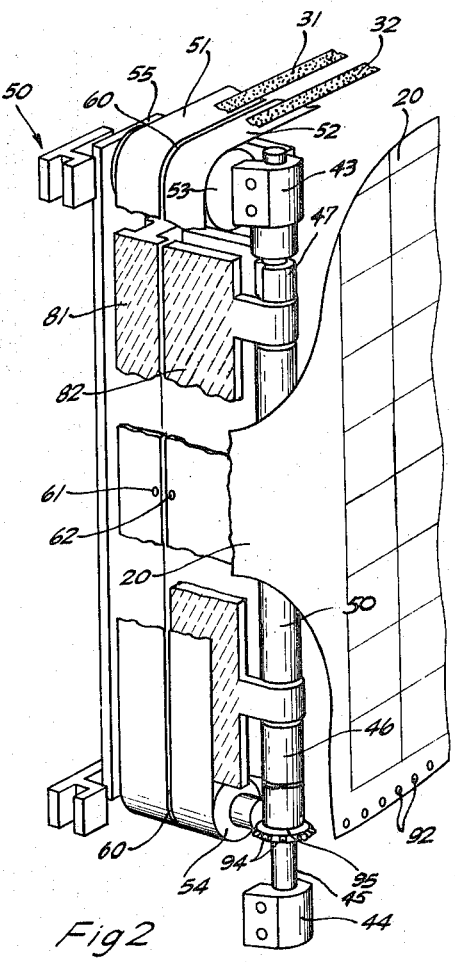
FIG. 2 is a perspective view of the recording station utilized in the apparatus of FIG. 1.

Referring now to FIGS. 2–4, a section of chart 20 is illustrated, aligned with a recording station so as to permit the formation of traces 21, 22 thereon. The section of chart is adapted to be moved continuously through the recording station, being dispensed from a chart supply roll not illustrated and advanced past the recording station to a take-up roll, again not illustrated. The chart supply roll, chart moving means, and chart storage station can be of conventional design and form no part of the present invention. For example, the corresponding elements of the aforementioned U.S. application Ser. No. 268,496 could be utilized with the recording station particularly described hereinafter.

It is envisioned that chart 20 be a pressure sensitive paper that is responsive to pressure exerted thereon from either side such that a trace is produced that is viewable from the front side of the paper. One such paper that is commercially available is marketed by 3M Corporation under the trade name Type 100, Sub. No. 12 Action Paper. However, it should be recognized that, if desired, a translucent type paper could be utilized such that a trace formed on the rear side thereof by inking or other conventional writing means is viewable from the front side of the paper through a transparent viewing plate.

As shown, the section of chart paper 20 to be written upon is aligned in the recording station between a transparent plate 42 formed of glass or other suitable transparent material having a hardened surface and a pair of flexible thin bands 51, 52, each of which carries a stylus 61, 62 adapted for writing upon the rear side of chart 20. In the embodiment illustrated chart 20 is provided with a row of holes 92 along the lower edge thereof which are engaged by projections or teeth 94 of an aligning sprocket 95. However, other means for aligning the chart with the recording station could be used.

Transparent plate 42 acts as a writing surface for the styli and writing pressure is exerted upon the styli by resilient means such as springs 71, 72 acting on backing bars 81, 82 each positioned against a corresponding flexible band. Recording or writing upon the chart is accomplished by movement of bands 51, 52 back and forth across the chart paper in a direction transverse to the direction of chart movement. The bands are supported, to facilitate this movement, upon twin roller sets 53, 54 rotatably supported at either end of a channel bracket 55 that is secured to the main frame of the recorder. More particularly, the roller sets are rotatably supported upon shafts 56, 57 suitably supported in openings 58, 59 formed in extending portions of bracket 55. Spacers 60 are provided dividing each roller set into a lefthand and a righthand portion to prevent the flexible bands from rubbing against each other. Thus, bands 51, 52 are movably supported in a parallel alignment with adjacent edges separated by a small distance, such as 0.010 inches, as determined by the width of spacers 60.

Suitable drive means are provided for selectively moving bands 51, 52 back and forth across the chart paper in response to individual electrical inputs to the recorder. A suitable drive arrangement is described in U.S. application Ser. No. 268,496 mentioned hereinbefore. However, any other suitable means of selectively moving bands 51, 52 back and forth across the chart paper could be utilized. Indicator strips 31, 32 illustrated in FIG. 1 are also mounted and driven in the same fashion as described in the aforementioned copending application. The strips could be supported and advanced by other means, so long as the indicator marks or colors on each strip correspond to the instantaneous position of a corresponding stylus.

The styli are secured, as shown, adjacent each other near the adjacent edges of bands 51, 52. Each stylus is formed as a punch mark in the corresponding flexible steel band. However, if desired, the styli could be separate members secured to the band by welding or soldering. In the embodiment disclosed, one stylus has a point that is round and of small diameter. The other stylus is formed in the tape as a generally conical surface of larger diameter having a dimple formed in the peak thereof so that the area of the stylus contacting the paper is in the form of a ring. This stylus configuration makes it possible to produce a wide trace with a minimum of total pressure of the stylus against the paper. As the ring moves across the paper it produces a trace width equal to its diameter with only enough pressure required to mark or form a ring rather than a solid circular area. It is desirable to minimize the total stylus pressure against the paper in order to minimize the chance of the stylus tearing or wearing through the paper. The use of the wide and narrow trace thus formed allows the operator a convenient way to identify and follow each trace as they cross back and forth over each other.

Referring still to FIGS. 2-4, plate 42 comprises an elongate member pivotably secured at one edge of bracket 55 by hinges 43, 44. In the embodiment illustrated, hinges 43, 44 comprise sections of an extruded member having an opening therein with an inner diameter of constant dimension. The hinges are pivotably supported upon a pin 45 that is received in suitable openings formed in similarly shaped extending arms 46, 47 of bracket 55. Spacers 48, 49 are provided between the hinges and plate 42 to provide adequate spacing between the bands and plate 42 for passage of paper 20 and bands 51 and 52 with the styli. These also serve as stops to limit the amount transparent plate 42 can be swung open so as not to damage indicator tapes 31 and 32.

As is best shown in the top view, plate 42 can be pivoted away from the chart paper to permit access thereto and when pivoted into its writing position, can be locked in place by a spring loaded locking member 50 pivotably secured at the other edge of bracket 55. Other suitable means of retaining plate 42 in a writing position could be utilized, if desired.

Backing bar 81 is pivotably secured to bracket 55 by means of extruded hinges 83, 84 which are pivotably mounted upon pin 45. As shown, backing bar 81 comprises an elongate bar having a recessed portion or channel 85 formed along its length on the side facing band 52. In addition an opening 86 is formed in bar 81 midway of its length and centered in channel 85 for a purpose described hereinafter. Backing bar 82 also comprises an elongate bar pivotably supported on bracket 55 by extruded hinges 88, 89 received upon pin 45. Bar 82 is adapted to fit within channel 85 formed in bar 81.

A screw 73 extends through the rear side of bar 82 adapted to receive one end of spring 72 over centering nut 87. The other end of spring 72 extends through opening 86, and rests against the inner channel of bracket 55. Nut 74 and screw 73 prevent bars 81 and 82 from swinging out of position when plate 42 is open. Accordingly, pressure is exerted by the spring against the back of support bar 82 and subsequently against band 52 to provide writing pressure for stylus 62.

Spring 71 is confined between bar 81 and channel 55. Accordingly, spring 71 exerts force against bar 81 and band 51 to provide writing pressure for stylus 61.

Plate 42 carries scale indicia 25, 26 on the front or operator side thereof. Due to the thickness of plate 42 some parallax is observed should an operator try to view the trace through plate 42. However, the use of indicator bands 31, 32 overlying the plate enables an operator to obtain an accurate reading of the instantaneous position of either styli without difficulty. In the embodiment illustrated, the physical displacement between the two traces amounts to about 0.060 inches or less depending upon the width of spacer 60 and upon the distance between the center of each stylus and the edge of its corresponding band. Accordingly, when translated into time displacement on a chart moving at several inches per hour, the time displacement of several minutes between the traces is much lower than would be present on other types of dual channel recorders permitting overlapping traces.

Another major advantage of the chart recorder described herein is the use of parallel styli adapted to write upon the rear side of the chart paper. This permits viewing of the trace from the front side immediately as it is formed and enables an operator to immediately observe the existence of transients. This function is considered to be essential where low chart drive speed recording is being carried out.

Although the preferred embodiment of the invention has been described in connection with a dual channel recorder utilizing two styli, it should be recognized that the recorder could be operated with only one stylus in writing configuration to provide single channel operation. Furthermore, an inking system and conventional inking styli could be utilized for writing on the rear side of transparent or translucent chart paper without departing from the scope of the invention.

Although the invention is described in conjunction with a strip chart recorder, it should be noted that the same principles, i.e., of writing on one side of a chart paper and viewing a trace from the other side thereof, could be utilized in X-Y or other types of recorders, if desired.

What is claimed is:

1. In a chart recorder adapted for forming closely spaced multiple traces from one side of a section of chart paper that are viewable from the other side of the chart paper, means for selectively aligning said section of chart paper within a recording station, said chart paper having first and second sides;

a transparent viewing and writing plate position at said recording station adjacent the first side of said section of the chart;

two flexible bands longitudinally movable parallel to each other in a plane parallel to said chart paper adjacent the second side of said chart paper;

two styli located at said recording station on the second side of said chart paper, each of said styli projecting from the surface of one of said bands transversely thereto toward said second side of said chart paper for forming a trace on said chart paper that is visible from the first side of said chart paper through said viewing and writing plate, each stylus being at the edge of one band adjacent the edge of the other band whereby they are movable in closely adjacent parallel paths, said paths being also parallel to said section of said chart paper and to said viewing and writing plate, and means for causing said styli to bear continuously and resiliently against said chart paper and said transparent vewing and writing plate for causing the chart paper to be pressed against the viewing and writing plate and thereby forming traces thereon that are immediately viewable through said viewing and writing plate.

2. The chart recorder comprising the combination of claim 1 with a section of chart paper wherein the chart paper is pressure sensitive, each of said styli includes a point formed in one of said flexible bands, each of said styli being adapted to bear against the pressure sensitive chart paper to form a trace thereon.

3. The chart recorder of claim 2 wherein each flexible band is supported upon rollers located adjacent the edges of the chart paper whereby the band is adapted for movement transverse to the direction of movement of the chart paper in a plane parallel thereto.

4. The chart recorder comprising the combination of claim 1 wherein said means for causing the styli to bear against the chart paper and the transparent viewing and writing plate comprises support bar means behind said bands and resilient means for exerting force through said support bar means upon said bands transversely to the surfaces thereof to provide writing pressure for said styli.

* * * * *